United States Patent [19]
Babin et al.

[11] Patent Number: 4,765,947
[45] Date of Patent: Aug. 23, 1988

[54] PROBE GUIDE DUCT DEVICE FOR A NUCLEAR REACTOR

[75] Inventors: Michel Babin, Pantin; Guy Desfontaines, Puteaux, both of France

[73] Assignee: Framatome, Courbevoie, France

[21] Appl. No.: 939,833

[22] Filed: Dec. 9, 1986

[30] Foreign Application Priority Data

Dec. 13, 1985 [FR] France .................... 85 18495

[51] Int. Cl.⁴ ........................................... G21C 17/10
[52] U.S. Cl. ................................ 376/347; 376/245; 376/247
[58] Field of Search ............... 376/245, 247, 249, 205, 376/263, 460, 260, 347, 463

[56] References Cited

U.S. PATENT DOCUMENTS

| | | | |
|---|---|---|---|
| 3,607,632 | 9/1971 | Hansen et al. | 376/245 |
| 3,827,935 | 8/1974 | Gruner et al. | 376/245 |
| 3,853,702 | 12/1974 | Bevilacqua et al. | 376/245 |
| 4,328,071 | 5/1982 | Moulin | 376/245 |
| 4,438,649 | 3/1984 | Gilman | 376/245 |
| 4,440,717 | 4/1984 | Bevilacqua et al. | 376/247 |
| 4,449,403 | 5/1984 | McQueen | 376/247 |

FOREIGN PATENT DOCUMENTS

2065512 7/1971 France .

*Primary Examiner*—Deborah L. Kyle
*Assistant Examiner*—Daniel Wasil
*Attorney, Agent, or Firm*—Pollock, Vande Sande & Priddy

[57] ABSTRACT

A device is provided concerning probe guide ducts for allowing a probe to pass for carrying out measurements on the coolant at the outlet of the assemblies (6) of a nuclear reactor (1). It comprises sleeves (9) through which pass upper columns (12) grouping together the guide ducts (10). After running horizontally along the periphery of the reactor, the ducts (10) are grouped together in lower columns (15) in the form of bundles before running towards the outlets of the coolant from the asemblies (6) in contact with the upper plate of the core (7). This device provides an excellent protection of the probe guide ducts with respect of the flow of the coolant.

5 Claims, 3 Drawing Sheets

PROBE GUIDE DUCT DEVICE FOR A NUCLEAR REACTOR

BACKGROUND OF THE INVENTION

1. Field of the Invention

The invention relates to a probe guide duct device or apparatus for nuclear reactors and is particularly suitable for temperature measuring probes in a pressurized water reactor (PWR), such as thermocouples.

More generally, the invention is suitable for every type of removable probe and is adaptable to every type of nuclear reactor comprising a pressure resistant vessel containing a coolant, a removable cover for said vessel, a core including fuel aassemblies, and having an upper plate and upper internal equipment fast with said plate and located between said core and said cover.

2. Prior Art

Different devices are already known. They comprise guide ducts or tubes passing through the reactor cover and extending down to the level of the top of the assemblies.

French Pat. No. 2,065,512, concerning a device for the instrumentation of a core of a pressurized water reactor, describes an arrangement in which guide ducts are provided for ball probes or stationary measurement probes around the periphery of a reactor cover. They are split horizontally above the internal equipments on support arms before extending down to the level of the core.

This solution has drawbacks. The guide ducts pass through the main flow without any particular protection against shocks or turbulence. The number of ducts is limited due to the density of the upper internal equipments, and the space already required by some of these equipments such as the guide tubes for the control clusters of the reactor.

However, such a device might seem sufficient to a man skilled in the art although certain measurements points such as temperature measurement points of the coolant at the outlet of the core, are not numerous.

SUMMARY OF THE INVENTION

It is an object of the invention to provide a device enabling:

better protection for the guide ducts against the dynamic effects of the coolant traversing the core, better protection against shocks during maintenance operations carried out on the cluster guides, better use of spaces and volumes directly situated above the assemblies of the upper internal equipments, thus freeing more space for equipments such as cluster control mechanisms, the possibility of increasing the number of measurement points since the path proposed for the guide duct no longer limits the number thereof.

To this end, the invention provides a guiding device for slidably guiding flexible probes of elongated shape in a nuclear reactor having :

a pressure resistant vessel for containment of a pressurized coolant, a removable cover for said vessel, a core located in said vessel, arranged to be upwardly traversed by a flow of said coolant, and internal equipments located between said core and said cover and including a perforated upper core plate in abutting contact with said core on operation of said reactor.

The guiding device for slidably guiding flexible probes of elongated shape within the vessel, comprises :

at least one sleeve sealingly projecting through and fixed to said cover, one upper tubular column corresponding to said sleeve, located within said sleeve and having a lower end in close proximity to said internal equipments, a plurality of lower tubular columns extending vertically across said internal equipments and distributed in areas where said coolant flow has a reduced turbulence, and a set of probe guide ducts in greater number than the number of said lower tubular columns, said set penetrating into said vessel along and within the upper tubular column, being fractionated at the lower end of said upper tubular column into a plurality of bundles each directed to a respective one of said lower columns, and the guide ducts in each of said bundles being mutually separated at a lower end of the respective lower tubular column and each of said guide ducts being directed along a substantially horizontal path at a horizontal level in immediate vicinity to said core to a respective terminal position where it has a closed distal end.

The above described device has advantages of particular importance in reactors comprising a large number of clusters, such as spectrum variation reactors and/or sub-moderated reactors using clusters for controlling and clusters for varying the energy spectrum of the neutrons.

A preferred embodiment shows lower vertical columns traversing the internal equipments and disposed around the periphery of the core. They are mounted to be freely expandable. The guide ducts have horizontal paths inserted in slits machined on the top of the core upper plate and maintained in position by a series of mechanical elements forming caps.

BRIEF DESCRIPTION OF THE DRAWINGS

The invention will be better understood from the following description of a particular embodiment, given by way of example. The description refers to the accompanying drawings in which.

DESCRIPTION OF A PREFERRED EMBODIMENT

Figure 1:
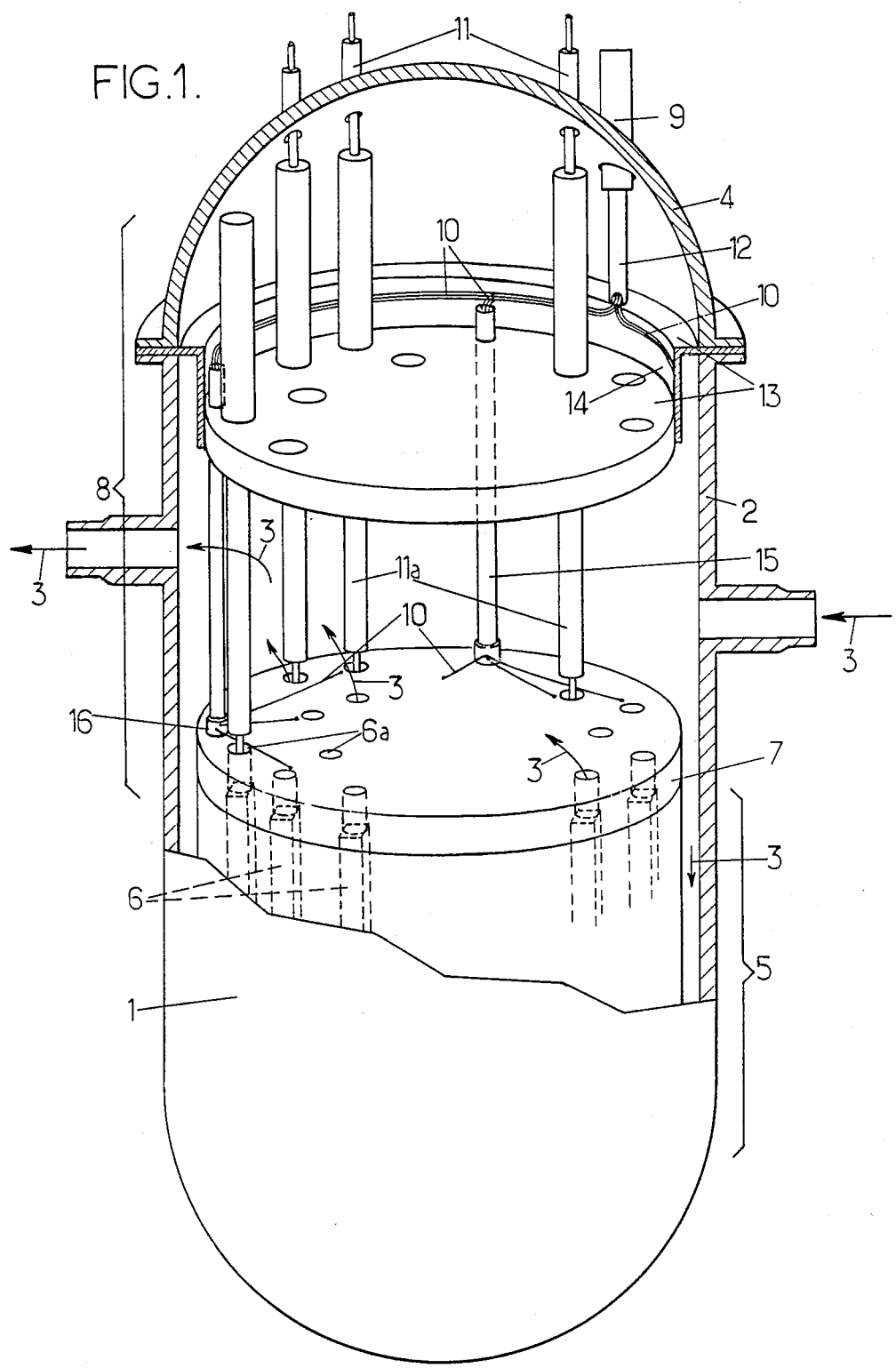
FIG. 1 is a general perspective and diagrammatic view of the device, and of its environment.
Figure 2:
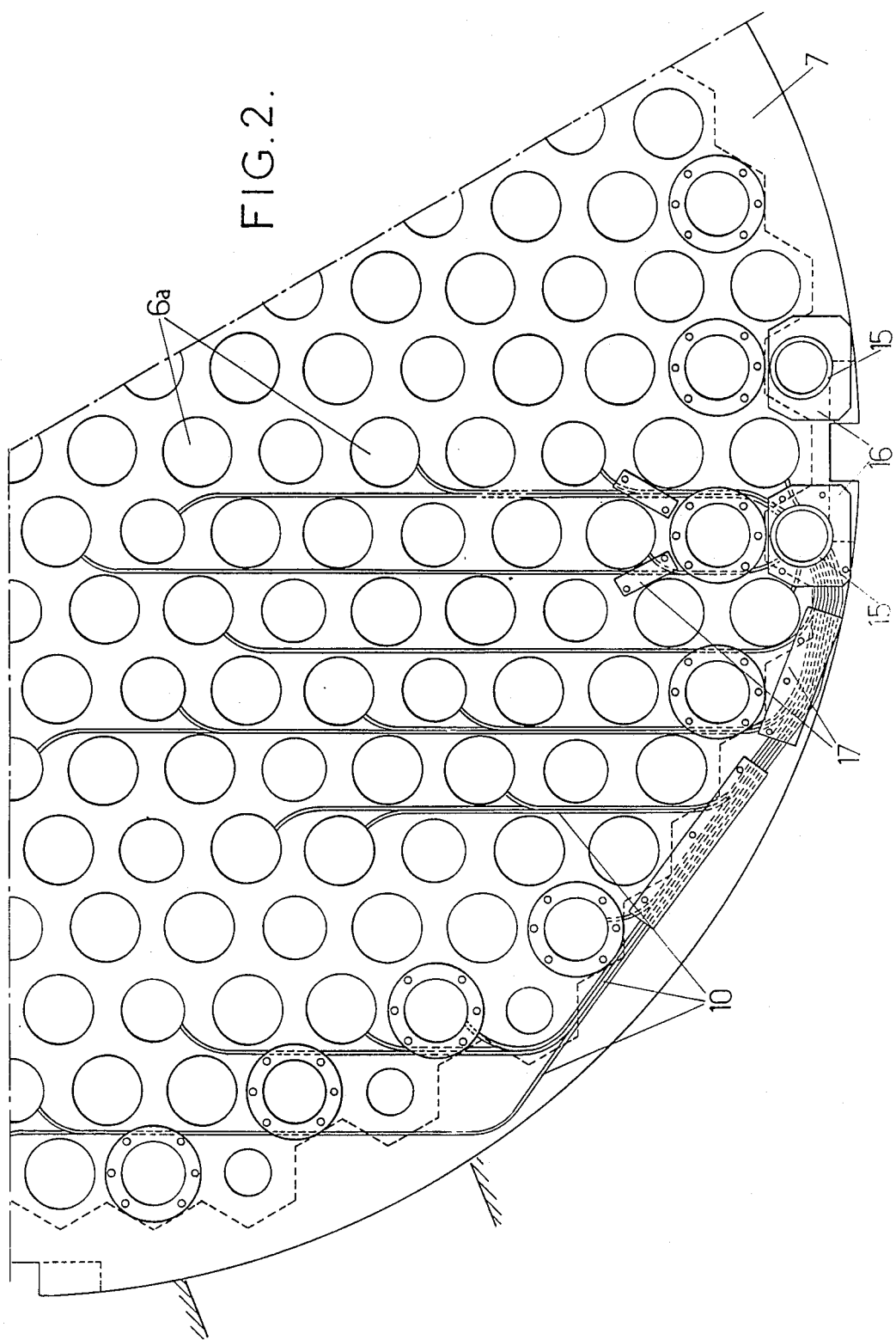
FIG. 2 is a top view of the upper plate of the reactor showing a possible layout of the guide ducts by way of example.
Figure 3:
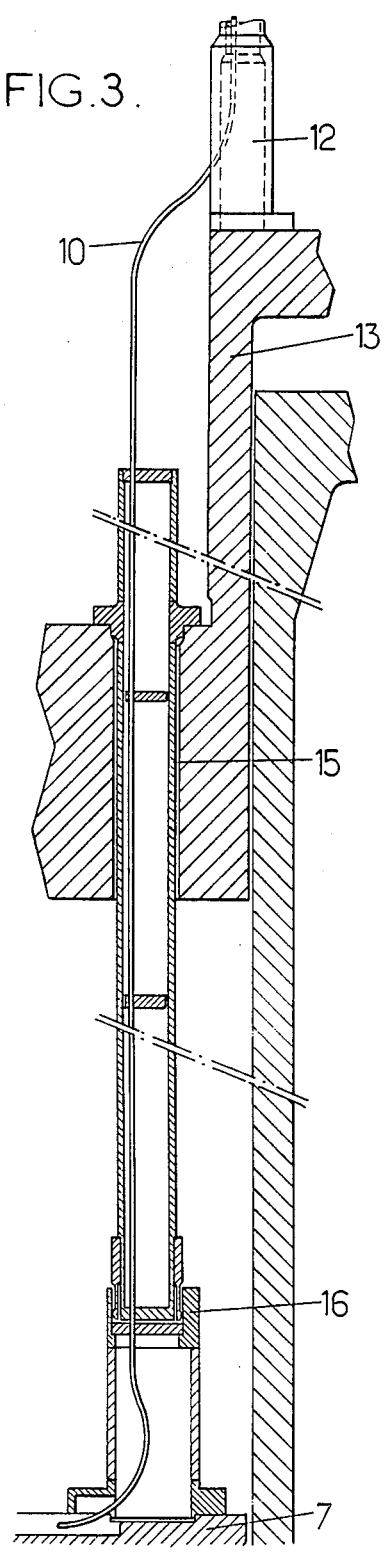
FIG. 3 shows a vertical lower column in section through a vertical plane passing through its axis.

FIG. 1 schematically shows a pressurized water reactor (PWR) 1 comprising a pressure resistant vessel 2 for a pressurized coolant flowing along the path 3, having a removable cover 4, a core 5 formed of fuel assemblies 6 having an upper plate 7 and internal equipments 8. The coolant conventionally traverses the core upwardly from the bottom of the assemblies to their top, as is well known for pressurized nuclear reactors.

The upper plate 7 is traversed by coolant through holes 6a. In FIG. 1, the assemblies 6 which are generally of polygonal section are shown in dotted lines.

Guide ducts 10 are provided for removable thermocouple probes for temperature measurements of the coolant flow at the outlet 6a of an assembly. Each guide duct or probe guide 10 has a closed distal end. The reactor comprises a plurality of sealingly projecting sleeves 9 through the cover 4 for containing the guide ducts 10. For the sake of simplification, only one sleeve has been represented in FIG. 1. The sleeves 9 are disposed around other cover penetrations such as cluster motorization penetration. Clusters are guided within the internal equipments by guiding columns 11a.

Guide ducts 10 are arranged together in upper columns 12. These columns traverse the sealingly projecting sleeves 9 and extend vertically downwards as far as the upper plate 13 of internal equipments 8 and rest thereon. They correspond to the penetrations mesh adapted on cover 4.

At the lower end of upper tubular columns 12 the guide ducts 10 are fractionated into a plurality of bundles so as to follow a horizontal path in the immediate vicinity of the internal surface of cover 4 and vessel 2.

As the ducts are closely disposed and fixed to the collar 14 of the upper plate 13, they are distributed in relatively protected areas situated away from the main flow of the coolant.

Once running along the periphery of the reactor, the guide ducts 10 fractioned into a plurality of bundles, are respectively directed to lower tubular columns 15, each bundle penetrating through the internal equipments 8 within and along said lower columns. The lower columns 15 are disposed in areas where the coolant flow has a reduced turbulence at the periphery of the reactor and are included in the volume of the upper internal equipments 8. They are fixed to the upper part of the upper plate 13 for example by bolting, and extend as far as bases 16 fast with the upper plate 7 of the core. They may expand freely in the lower part by sliding within said bases 16 which provide centering and guidance of columns 15.

They allow the bends of thermocouple guide ducts 10 to pass while complying, as in the rest of the device of the invention, with the minimum radius of curvature allowing withdrawal and re-engagement of the wires of the thermocouples. The value of said radius of curvature is greater than 150 mm for the thermocouples usually used in PWR reactors.

At the level of the upper plate 7 of core 5 and the lower end of the respective lower column, the bundles of guide ducts 10 are mutually separated. Each guide duct is directed to a respective terminal position in the immediate vicinity of the hole 6a confronting the top point of a nuclear assembly 6 to be monitored. Each guide runs along a substantially horizontal path at a horizontal level in grooves of a depth greater than the diameter of the ducts formed in plate 7.

These guide ducts are held in position by mechanical pieces forming caps 17 fixed to the upper plate of core 5.

We claim:

1. In a nuclear reactor having:
   a pressure resistant vessel for containment of a pressurized coolant,
   a removable cover for said vessel,
   a core located in said vessel, arranged to be upwardly traversed by a flow of said coolant, and
   internal equipment located between said core and said cover and including a perforated upper core plate in abutting contact with said core on operation of said reactor and an upper equipment plate located near said cover,
   a guiding device for slidably guiding flexible probes of elongated shape wihtin said vessel, comprising :
   at least one sleeve sealingly projecting through and fixed to said cover,
   one upper tubular column corresponding to each sleeve, located within said sleeve and having a lower end in close proximity to said upper equipment plate,
   a plurality of lower tubular columns extending vertically across said internal equipment and distributed in areas where said coolant flow has a reduced turbulence,
   and a set of probe guide ducts in greater number than the number of said lower tubular columns, said set penetrating into said vessel along and within the upper tubular column, being fractionated at the lower end of said upper tubular column into a plurality of bundles each directed for passing downwardly within and along a respective one of said lower tubular columns and the guide ducts in each of said bundles being mutually separated at a lower end of said respective lower tubular column and each of said guide ducts being directed along a substantially horizontal path at a horizontal level in immediate vicinity to said core to a respective terminal position where it has a closed distal end.

2. A guiding device according to claim 1, wherein each of said probe guide ducts is retained against said upper core plate in a portion thereof between the lower end of the respective lower tubular column and the terminal position of said probe guide duct.

3. A guiding device according to claim 1, wherein each of said bundles is located in close proximity to an internal suface of said cover and vessel between said upper column and the respective lower column.

4. A guiding device according to claim 1, wherein said lower columns are distibuted at the periphery of said internal equipment, are fixed at their upper end to said upper plate of said internal equipment and are slidably connected to the upper core plate at their lower end.

5. A guiding device according to claim 1, wherein the radius of curvature of said guide ducts is greater than 150 mm.

* * * * *